US012098576B2

(12) United States Patent
Eichel

(10) Patent No.: US 12,098,576 B2
(45) Date of Patent: Sep. 24, 2024

(54) MOTOR VEHICLE LOCK

(71) Applicant: Kiekert AG, Heiligenhaus (DE)

(72) Inventor: Dirk Eichel, Velbert (DE)

(73) Assignee: Kiekert AG, Heiligenhaus (DE)

( * ) Notice: Subject to any disclaimer, the term of this patent is extended or adjusted under 35 U.S.C. 154(b) by 278 days.

(21) Appl. No.: 17/285,138

(22) PCT Filed: Sep. 24, 2019

(86) PCT No.: PCT/DE2019/100835

§ 371 (c)(1),
(2) Date: Apr. 14, 2021

(87) PCT Pub. No.: WO2020/078507

PCT Pub. Date: Apr. 23, 2020

(65) Prior Publication Data

US 2022/0003023 A1 Jan. 6, 2022

(30) Foreign Application Priority Data

Oct. 16, 2018 (DE) ..................... 10 2018 125 641.8

(51) Int. Cl.
*E05B 85/26* (2014.01)
*E05B 77/38* (2014.01)
*E05B 81/14* (2014.01)

(52) U.S. Cl.
CPC .............. *E05B 77/38* (2013.01); *E05B 81/14* (2013.01); *E05B 85/26* (2013.01)

(58) Field of Classification Search
CPC ........ E05B 85/20; E05B 85/24; E05B 85/243; E05B 85/26; E05B 81/14
See application file for complete search history.

(56) References Cited

U.S. PATENT DOCUMENTS 8,235,428 B2 * 8/2012 Hunt ...................... E05B 85/26 292/216
9,617,761 B2 * 4/2017 Scholz .................... E05B 85/26
(Continued)

FOREIGN PATENT DOCUMENTS

CN 104120927 A * 10/2014 ............. E05B 83/24
DE 4219429 C1 * 11/1993 ............. E05B 85/26
(Continued)

OTHER PUBLICATIONS

Translation of International Search Report issued Dec. 3, 2019, for International Patent Application No. PCT/DE2019/100835.

*Primary Examiner* — Alyson M Merlino
(74) *Attorney, Agent, or Firm* — Renner, Otto, Boisselle & Sklar, LLP

(57) ABSTRACT

A motor vehicle lock, in particular a motor vehicle door lock, which has a locking mechanism consisting of a rotary latch and at least one pawl. The pawl exerts an opening torque ($U_1$, $U_2$) on the rotary latch. In addition, the pawl has an arched contact region, which interacts with a latching contour of the rotary latch. The contact region of the pawl has a first arch portion and a second arch portion, each having different radiuses ($R_1$, $R_2$). According to the invention, the first arch portion has, in the closing direction (S) of the locking mechanism, a larger radius ($R_1$) than the second following arch portion having the radius ($R_2$) there.

18 Claims, 3 Drawing Sheets

(56) References Cited

U.S. PATENT DOCUMENTS

| | | | | |
|---|---|---|---|---|
| 10,138,657 | B2 * | 11/2018 | Bendel | E05B 85/26 |
| 2014/0103666 | A1 * | 4/2014 | Yamazaki | E05B 85/26<br>292/121 |
| 2015/0097378 | A1 * | 4/2015 | Graute | E05B 85/26<br>292/194 |

FOREIGN PATENT DOCUMENTS

| | | | | | |
|---|---|---|---|---|---|
| DE | 102009029031 | A1 | * | 3/2011 | E05B 77/36 |
| DE | 102009029041 | A1 | * | 3/2011 | E05B 85/26 |
| DE | 202012000134 | U1 | | 4/2013 | |
| DE | 102012023236 | A1 | | 5/2014 | |
| DE | 102013103245 | A1 | | 10/2014 | |
| DE | 202009019025 | U1 | | 8/2015 | |
| GB | 2168745 | A | * | 6/1986 | E05B 85/26 |
| KR | 200141630 | Y1 | * | 1/1999 | |
| WO | 2013163982 | A2 | | 11/2013 | |

* cited by examiner

MOTOR VEHICLE LOCK

This application is a national phase of International Application No. PCT/DE2019/100835 filed Sep. 24, 2019, which claims priority to German Application No. 10 2018 125 641.8 filed Oct. 16, 2018.

FIELD OF DISCLOSURE

The invention relates to a motor vehicle lock, in particular a motor vehicle door lock, which has a locking mechanism consisting of a rotary latch and at least one pawl, wherein the pawl exerts an opening torque on the rotary latch, wherein the pawl further has an arched contact region, which interacts with a latching contour of the rotary latch, and wherein the contact region of the pawl has a first arch portion and a second arch portion, each having different radiuses.

BACKGROUND OF DISCLOSURE

The aforementioned motor vehicle locks are not restricted to motor vehicle door locks. Basically, tailgate locks, front hood locks, tank flap locks, loading flap locks, etc. can also be meant at this point and are also included in the invention.

With such motor vehicle locks and in particular motor vehicle door locks, the state of the art according to WO 2013/163982 A2 proceeds in such a way that the rotary latch introduces a torque into the pawl, in particular an opening torque. In this way, the opening operation of the associated locking mechanism is supported based on the rotary latch and the pawl. This is particularly helpful when, for example, a tailgate or front hood is to be opened so far that an operator can reach behind a gap in order to open the hood or tailgate in question. The same applies, of course, when a motor vehicle side door is to be opened.

For reasons of convenient opening and in particular to implement a low-noise locking mechanism, a two-pawl or multi-pawl locking mechanism is often used, as described in the scope of DE 10 2013 103 245 A1 by the applicant. A convenience pawl and a locking pawl are implemented here. The convenience pawl is blocked with the aid of the pawl and in turn ensures that the rotary latch assumes and maintains its closed position or latching position. This has proven itself in principle.

In the generic state of the art according to DE 20 2009 019 025 U1, the pawl there is not only used to lock the rotary latch in the pre-ratchet and the main ratchet. Rather, in the pre-locking position, the pawl has a closing torque that acts on the rotary latch. In addition, the contour or the contact region of the pawl is also designed in such a way that the pawl exerts an opening torque on the rotary latch in the main locking position.

In detail, a flat contour region is implemented on the pawl, which causes a latching in the pre-ratchet. In contrast, a different contour region is provided on the pawl for the main ratchet. In this way, it should be possible overall to provide the pre-ratchet position on the same locking level as the main ratchet position. A comparable locking mechanism for a lock of a motor vehicle is presented and described in DE 10 2009 029 031 A1.

The state of the art mentioned and previously acknowledged is not free from defects. Because if the pawl exerts an opening torque on the rotary latch, this opening torque is only made available, for example, during the opening of the locking mechanism. As a result, situations are possible in practice which lead to the opening torque of the pawl having a reduced effect or no effect at all on the rotary latch. This applies, for example, to the case that there is dirt between the arched contact region on the pawl and the latching contour of the rotary latch in the closed position of the locking mechanism or, for example, as a result of a long downtime, increased holding forces due to moisture, corrosion etc. As a result of this, the associated motor vehicle lock can no longer be opened properly, in particular opened electrically, under certain circumstances. In addition, the closing operation is also impaired by any dirt or dust in this region. The invention as a whole seeks to remedy this.

SUMMARY OF DISCLOSURE

The invention is based on the technical problem of further developing such a motor vehicle lock and in particular a motor vehicle door lock in such a way that the functionality is improved and, in particular, a secure collapse when closing as well as a perfect opening are ensured.

To solve this technical problem, the invention proposes in a generic motor vehicle lock and in particular in a motor vehicle door lock that the first arch portion of the contact region of the pawl has a larger radius in the closing direction of the locking mechanism than the second following arch portion with the radius there.

This dimensioning rule first of all ensures that the first arch portion with the larger radius in the closing direction of the locking mechanism has a large so-called "pre-cut." In fact, according to the explanations in DE 10 2013 103 245 already mentioned and referred to, the pre-cut expresses how large the opening torque of the pawl is designed for the rotary latch. Since the first arch portion of the contact region of the pawl with the latching contour of the rotary latch has a larger radius than the second following arch portion, this also corresponds to a higher torque exerted by the pawl on the rotary latch during an opening operation than in the second arch portion. In this way, any contamination or holding forces that may be present in the contact region of the pawl with the latching contour of the rotary latch can on the one hand be easily overcome. On the other hand, these increased torques may be associated with increased forces when opening the locking mechanism, as will be explained in detail below.

Since the second arch portion following the first arch portion in the closing direction of the locking mechanism is equipped with the smaller radius in comparison, a reduced torque or opening torque of the pawl is observed with increasing closed position, particularly in the closed position of the locking mechanism. This is advantageous in that it ensures that the pawl can securely collapse into the latching contour of the rotary latch during the closing operation of the locking mechanism, without the still existing opening torque or opening torque of the pawl preventing or making this difficult. Herein lie the essential advantages.

According to an advantageous embodiment, the two arch portions in the contact region of the pawl are arranged and designed in such a way that they directly adjoin one another in the closing direction of the locking mechanism. In other words, in the closing direction of the locking mechanism, the latching contour of the rotary latch first strike the first arch portion with the larger radius and consequently the higher opening torque of the pawl and then the second arch portion with the smaller radius and lower opening torque until the closed position of the locking mechanism is reached. As a result, the pawl can fall securely into the latching contour of the rotary latch and thus a secure collapse when closing is ensured. In this context, the two adjoining arch portions ensure that the pre-cut, i.e. the opening torque exerted by the pawl on the rotary latch, is designed to be variable, namely in such a way that the opening torque decreases in the closing direction of the locking mechanism.

In order to achieve this in detail, the two arch portions are also equipped with different arch lengths. In fact, the first arch portion regularly has a larger arch length than the second arch portion. Here, arch lengths for the first arch portion of 8 mm and more have proven to be particularly favorable. In contrast, the second arch portion is equipped with an arch length of 5 mm and less.

In addition, the design is usually such that the first arch portion in the closing direction of the locking mechanism is adapted to the latching contour of the rotary latch in the contact region of the pawl. For this purpose, the design is such that the first arch portion of the pawl in question overlaps a specific arch length with an associated arched contour region of the latching contour of the rotary latch. As a result of this overlap, the region of the first arch portion of the contact region of the pawl becomes less sensitive to dust, dirt, or any holding forces.

The pawl of the motor vehicle lock according to the invention is generally a convenience pawl which, together with an additionally provided pawl and the rotary latch, defines a two-pawl locking mechanism or multi-pawl locking mechanism. In other words, the two arch portions and consequently the contact region of the pawl are each arranged on the convenience pawl. In addition, the design is usually made such that the second arch portion of the convenience pawl is adapted to an arched abutment region of the locking pawl for the convenience pawl.

In other words, in the closed position of the locking mechanism, the pawl with its arched abutment region ensures that the convenience pawl is held securely in engagement with the latching contour of the rotary latch and cannot pivot open in the opening direction. In fact, the convenience pawl is mostly equipped with a spring which acts on the convenience pawl in an opening direction and also ensures that the opening torque described above is applied to the rotary latch via the first arch portion and the second arch portion.

By adapting the second arch portion of the convenience pawl to the arched abutment region of the pawl for the convenience pawl, the invention ensures that, in the closed position of the locking mechanism, the opening torque exerted by the convenience pawl on the rotary latch corresponds approximately to the closing torque that the pawl securing the convenience pawl exerts over its arched abutment region onto the convenience pawl. As a result, the convenience pawl is held securely in place on the latching contour of the rotary latch. At the same time, the pawl can easily be pivoted away from the convenience pawl during an opening operation, which then releases the rotary latch. In other words, in the closed position of the locking mechanism, there is largely an overlap of the radiuses of the arched abutment region of the pawl on the one hand and the second arch portion of the convenience pawl on the other hand. For example, the radius of the second arch portion of the convenience pawl can substantially correspond to the radius of the abutment region of the locking pawl.

As a result, the pawl can be lifted out with relatively little effort and releases the convenience pawl during the opening operation of the locking mechanism. The convenience pawl, in turn, swings open, supported by the force of the spring, and supports the opening movement of the rotary latch due to the opening torque increasing in the opening direction of the locking mechanism. Conversely, in the closing direction of the locking mechanism, the variable design of the pre-cut ensures that the opening torque exerted by the convenience pawl on the locking pawl is reduced in the closing direction of the locking mechanism, so that a secure collapse of the convenience pawl into the rotary latch is provided when closing the locking mechanism. In this way, the functionality is significantly improved overall compared to the state of the art. Herein lie the essential advantages.

BRIEF DESCRIPTION OF DRAWINGS

The invention is explained in greater detail below with reference to drawings, which show only one exemplary embodiment. In the drawings.

DETAILED DESCRIPTION

Figure 1:
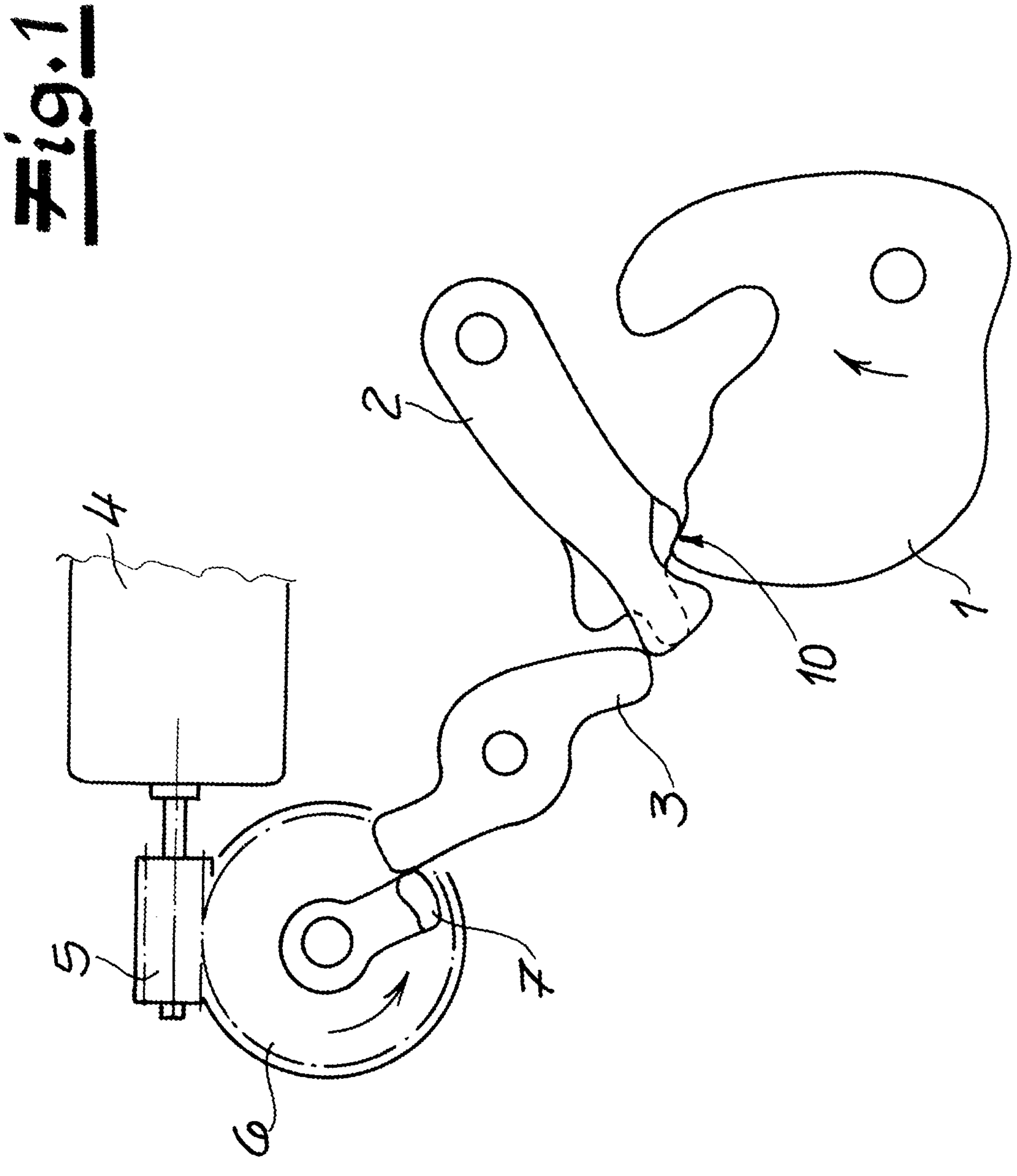
FIG. 1 shows the motor vehicle lock according to the invention reduced to the elements essential for the invention.

The drawings show a motor vehicle lock which, in the exemplary embodiment, is a motor vehicle door lock and in particular a motor vehicle side door lock. This motor vehicle lock has a locking mechanism 1, 2, 3, which is composed of a rotary latch 1 and two pawls 2, 3. The first pawl 2 is designed as a convenience pawl, while the further second pawl 3 is or can be designed as a second pawl or blocking pawl that secures the convenience pawl 2 in the closed position. FIG. 1 shows the closed position of the locking mechanism or 2-pawl locking mechanism 1, 2, 3. In the closed position, the blocking pawl 3 ensures that the convenience pawl 2 secures the rotary latch 1 and does not pivot away.

In FIG. 1, an electric motor drive 4-7 is then also implemented and shown. The electric motor drive 4-7 acts as an opening drive for electrically opening the locking mechanism 1, 2, 3. For this purpose, the electric motor drive 4-7 is composed of an electric motor 4, a worm 5 arranged on an output shaft of the electric motor 4, and a worm wheel 6 meshing with the worm 5. To open the locking mechanism 1, 2, 3, the worm wheel 6 is acted upon in the counterclockwise direction indicated here, as shown in FIG. 1. As a result, a radial lug 7 arranged on the worm wheel 6 can work on the blocking pawl 3 in such a way that it is lifted from its engagement with the convenience pawl 2. As a consequence of this, the convenience pawl 2 can swing open by the force of a spring (not shown) and in turn releases the rotary latch 1, which also swings open, supported by a spring, as indicated by a further arrow in FIG. 1.

Figure 2:
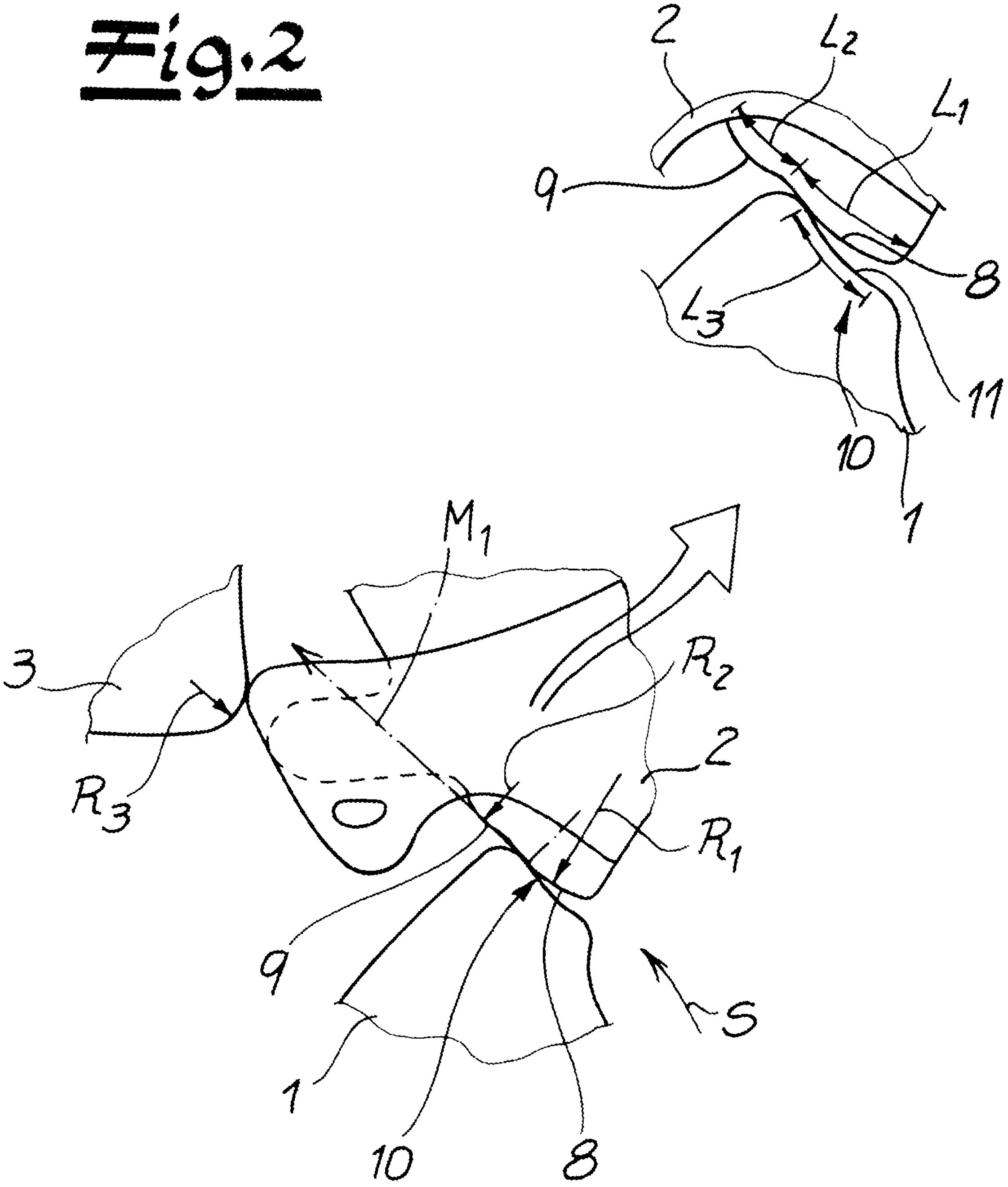
FIG. 2 shows an enlarged section from FIG. 1 during a closing operation of the locking mechanism.
Figure 3:
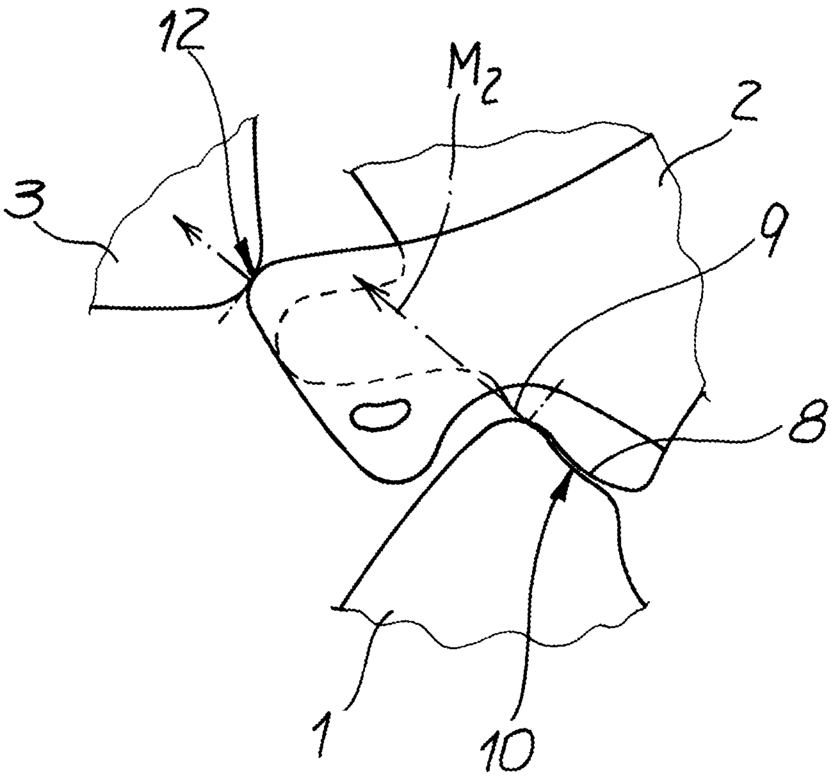
FIG. 3 shows the further closing operation until the closed position is reached, starting from FIG. 2.

In FIGS. 2 and 3, the particular design of the convenience pawl 2 is now shown. In fact, only the convenience pawl 2, the rotary latch 1, and the blocking pawl 3 can be seen in FIGS. 2 and 3 in sections and reduced to the essential regions.

The convenience pawl 2 is equipped with an arched contact region 8, 9. In the closed position of the locking mechanism 1, 2, 3, as shown in FIG. 3, while FIG. 2 shows the reaching of the closed position, the contact region 8, 9 on the convenience pawl 2 interacts with a latching contour 10 on the rotary latch 1. The contact region 8, 9 of the convenience pawl 2 is equipped with a first arch portion 8 and a second arch portion 9 in the closing direction of the locking mechanism 1, 2, 3, each of which has different radiuses $R_1$, $R_2$.

According to the invention, the first arch portion 8, which first interacts with the latching contour 10 of the rotary latch 1 in the closing direction S of the locking mechanism 1, 2, 3, has a larger radius or first radius $R_1$ than the second subsequentially following arch portion 9, whose associated additional radius $R_2$ on the other hand is dimensioned smaller relative thereto.

In other words, the following applies:

$$R_1>R_2.$$

In addition, it can be seen in particular from a comparative consideration of FIGS. 2 and 3 that the two arch portions 8, 9, i.e. the first arch portion 8 and the second arch portion 9 on the convenience pawl 2 in the closing direction S of the locking mechanism 1, 2, 3, connect directly adjacent to one another, i.e. without a gap or intermediate region. In addition, the two arch portions 8, 9 are equipped with different arch lengths $L_1$ and $L_2$. The arch length $L_1$ of the first arch portion 8 is generally larger than or equal to 8 mm. In contrast, the second arch portion 9 is equipped with an arch length $L_2$ which is 5 mm and less in the exemplary embodiment.

The first arch portion 8 is adapted to the latching contour 10 of the rotary latch 1, as can be seen in particular in FIG. 2. In fact, the design is such that the first arch portion 8 of the convenience pawl 2 overlaps with a corresponding arched contour region 11 of the rotary latch 1 over a specific arch length $L_3$. The overlap between the arch length $L_3$ of the arched contour region 11 of the latching contour 10 of the rotary latch 1 and the first arch portion 8 on the convenience pawl 2 may be approximately 20% to 70% of the arch length $L_1$ of the first arch portion 8 on the convenience pawl 2, which of course only applies by way of example.

In contrast, the second arch portion 9 on the convenience pawl 2 is adapted to an arched abutment region 12 of the locking pawl 3. In fact, the radius $R_2$ of the second arch portion 9 on the convenience pawl 2 substantially corresponds to the associated radius $R_3$ of the abutment region 12 of the pawl 3, which moves against the convenience pawl 2 in the closed position of the locking mechanism 1, 2, 3 shown in FIG. 3 and ensures that the convenience pawl 2 cannot pivot open in the closed position shown there.

Based on a comparison of FIGS. 2 and 3, it can be seen that the two arch portions 8, 9 on the convenience pawl 2 and the associated radiuses $R_1$ and $R_2$ correspond to different opening torques $M_1$ and $M_2$, which act on the rotary latch 1. Thereby, the torque or opening torque $M_1$ exerted by the first arch portion 8 of the convenience pawl 2 to the rotary latch 1 is formed correspondingly larger due to the larger radius $R_1$ in this region than the second torque $M_2$ associated with the second arc portion 9 and exerted at this point onto the rotary latch 1. In other words, the following applies:

$$M_1>M_2.$$

As a result, a variable pre-cut is made available overall on the convenience pawl 2, namely initially a large pre-cut or a large opening torque $M_1$ in the closing direction S of the locking mechanism 1, 2, 3 and immediately thereafter a smaller pre-cut and, associated therewith, a smaller opening torque $M_2$.

LIST OF REFERENCE SIGNS

| | | | |
|---|---|---|---|
| 1, 2, 3 | Locking mechanism/Two-pawl locking mechanism | 1 | Rotary latch |
| | | 2 | Convenience pawl |
| | | 3 | Pawl/Blocking pawl |
| 4, 5, 6, 7 | Electric motor drive | 4 | Electric motor |
| | | 5 | Worm |
| | | 6 | Worm wheel |
| | | 7 | Radial lug |
| 8, 9 | Contact region | 8 | First arch portion |
| | | 9 | Second arch portion |
| 10 | Latching contour | | |
| 11 | Contour region | | |
| 12 | Abutment region | | |
| $L_1$, $L_2$ | Arch lengths | $L_1$ | Arch length of the first arch portion 8 |
| | | $L_2$ | Arch length of the second arch portion 9 |
| | | $L_3$ | Arch length of the contour region 11 |
| $M_1$, $M_2$ | Torques/Opening toques | $M_1$ | First torque |
| | | $M_2$ | Second torque |
| $U_1$, $U_2$ | Opening torque | | |
| $R_1$, $R_2$ | Radiuses | $R_1$ | Radius of the first arch portion 8 |
| | | $R_2$ | Radius of the second arch portion 9 |
| S | Closing direction | | |

The invention claimed is:

1. A motor vehicle lock comprising:

a locking mechanism including a rotary latch and a two-pawl locking mechanism with a convenience pawl and a blocking pawl, wherein the convenience pawl exerts an opening torque on the rotary latch, wherein the convenience pawl has an arched contact region which interacts with a latching contour of the rotary latch, wherein the arched contact region of the convenience pawl has a first arch portion and a second arch portion having different radiuses, wherein the first arch portion has a radius larger than a radius of the second arch portion, wherein the second arch portion follows the first arch portion in a closing direction of the locking mechanism forming an indent therebetween, wherein the radius of the second arch portion of the convenience pawl corresponds to a radius of an arched abutment region of the blocking pawl, wherein the abutment region engages the convenience pawl in a closed position of the locking mechanism, wherein the first arch portion directly engages an inwardly arched contour region of the latching contour of the rotary latch over at least a partial arch length of the first arch portion in the closed position of the locking mechanism, and wherein in a closing operation of the locking mechanism, the latching contour of the rotary latch first strikes the first arch portion with the larger radius and then the second arch portion with the smaller radius until the closed position of the locking mechanism is reached and the latching contour maintains engagement with the second arch portion and engages the indent between the first arch portion and the second arch portion in the closed position.

2. The motor vehicle lock according to claim 1, wherein the first arch portion and the second arch portion directly adjoin one another in the closing direction of the locking mechanism.

3. The motor vehicle lock according to claim 2, wherein the first arch portion and the second arch portion directly adjoin one another without a gap therebetween.

4. The motor vehicle lock according to claim 2, wherein an end of the first arch portion forms an end of the second arch portion.

5. The motor vehicle lock according to claim 1, wherein the first arch portion and the second arch portion have different arch lengths.

6. The motor vehicle lock according to claim 1, wherein the first arch portion has an arch length larger than an arch length of the second arch portion.

7. The motor vehicle lock according to claim 6, wherein the arch length of the first arch portion is more than 8 mm and the arch length of the second arch portion is 5 mm or less.

8. The motor vehicle lock according to claim 1, wherein the first arch portion is adapted to the latching contour of the rotary latch.

9. The motor vehicle lock according to claim 1, wherein the first arch portion overlaps with the inwardly arched contour region of the latching contour of the rotary latch over a specific arch length.

10. The motor vehicle lock according to claim 9, wherein an overlap between the first arch portion and the specific arch length is 20% to 70% of an arch length of the first arch portion.

11. The motor vehicle lock according to claim 1, wherein the first arch portion and the second arch portion are arched outwardly relative to a main body of the convenience pawl.

12. The motor vehicle lock according to claim 1, wherein the larger radius of the first arch portion corresponds to a larger opening torque relative to a torque corresponding to the radius of the second arch portion.

13. The motor vehicle lock according to claim 1, wherein the blocking pawl is an additionally provided pawl.

14. The motor vehicle lock according to claim 13, wherein the convenience pawl is connected between the blocking pawl and the rotary latch.

15. The motor vehicle lock according to claim 1, further comprising an electric motor drive that acts on the blocking pawl.

16. The motor vehicle lock according to claim 1, wherein the first arch portion directly engages the inwardly arched contour region of the latching contour of the rotary latch over 20%-70% of an arch length of the first arch portion in the closed position.

17. The motor vehicle lock according to claim 1, wherein the second arch portion on the convenience pawl is adapted to the arched abutment region of the blocking pawl such that the opening torque exerted by the second arch portion of the convenience pawl on the rotary latch corresponds to a closing torque that the blocking pawl securing the convenience pawl exerts over the arched abutment region onto the convenience pawl in the closed position.

18. A motor vehicle lock comprising:

a locking mechanism including a rotary latch and a two-pawl locking mechanism with a convenience pawl and a blocking pawl, wherein the convenience pawl exerts an opening torque on the rotary latch, wherein the convenience pawl has an arched contact region which interacts with a latching contour of the rotary latch, wherein the arched contact region of the convenience pawl has a first arch portion and a second arch portion having different radiuses, wherein the first arch portion has a radius larger than a radius of the second arch portion, wherein the second arch portion follows the first arch portion in a closing direction of the locking mechanism forming an indent therebetween, wherein the radius of the second arch portion of the convenience pawl corresponds to a radius of an arched abutment region of the blocking pawl, wherein the abutment region engages the convenience pawl in a closed position of the locking mechanism, wherein the second arch portion on the convenience pawl is adapted to the arched abutment region of the blocking pawl such that the opening torque exerted by the second arch portion of the convenience pawl on the rotary latch corresponds to a closing torque that the blocking pawl securing the convenience pawl exerts over the arched abutment region onto the convenience pawl in the closed position, and wherein in a closing operation of the locking mechanism, the latching contour of the rotary latch first strikes the first arch portion with the larger radius and then the second arch portion with the smaller radius until the closed position of the locking mechanism is reached and the latching contour maintains engagement with the second arch portion and engages the indent between the first arch portion and the second arch portion in the closed position.

* * * * *